United States Patent
Rickert et al.

(10) Patent No.: US 7,360,351 B2
(45) Date of Patent: Apr. 22, 2008

(54) FRONT HARVESTING ATTACHMENT

(75) Inventors: Clemens Rickert, Stadtlohn (DE); Martin Hüning, Billerbeck (DE); Leo Schulze Hockenbeck, Everswinkel (DE); Klemens Weitenberg, Borken (DE)

(73) Assignee: Maschinenfabrik Kemper GmbH & Co KG, Stadtlohn (DE)

( * ) Notice: Subject to any disclaimer, the term of this patent is extended or adjusted under 35 U.S.C. 154(b) by 0 days.

(21) Appl. No.: 11/393,033

(22) Filed: Mar. 30, 2006

(65) Prior Publication Data

US 2006/0225396 A1  Oct. 12, 2006

(30) Foreign Application Priority Data

Apr. 9, 2005  (DE) ............... 10 2005 016 350

(51) Int. Cl.
*A01B 73/00* (2006.01)
(52) U.S. Cl. ........................................ 56/228
(58) Field of Classification Search .............. 56/228, 56/15.2, 118, DIG. 9, 14.5, 13.6; 172/311, 172/456
See application file for complete search history.

(56) References Cited

U.S. PATENT DOCUMENTS

| | | | | |
|---|---|---|---|---|
| 3,115,738 A | * | 12/1963 | Engler | 56/6 |
| 3,668,844 A | * | 6/1972 | Akgulian et al. | 56/7 |
| 3,683,601 A | | 8/1972 | Van der Lely | 56/6 |
| 4,135,349 A | * | 1/1979 | Schwertner | 56/6 |
| 4,370,846 A | * | 2/1983 | Arnold | 56/6 |
| 4,409,780 A | * | 10/1983 | Beougher et al. | 56/228 |
| 4,497,160 A | * | 2/1985 | Mullet et al. | 56/6 |
| 4,848,069 A | * | 7/1989 | Ermacora et al. | 56/15.8 |
| 5,540,290 A | | 7/1996 | Peterson et al. | 172/311 |
| 5,724,798 A | * | 3/1998 | Stefl et al. | 56/119 |
| 5,845,472 A | * | 12/1998 | Arnold | 56/94 |
| 6,598,381 B2 | * | 7/2003 | Albinger et al. | 56/15.2 |
| 2002/0017090 A1 | * | 2/2002 | Hockenbeck | 56/16.2 |

FOREIGN PATENT DOCUMENTS

| | | |
|---|---|---|
| DE | 35 39 064 | 11/1985 |
| DE | 100 36 029 | 7/2000 |
| DE | 101 42 978 A1 | 3/2003 |
| DE | 102 13 993 C1 | 4/2003 |
| EP | 1 159 863 A2 | 12/2001 |
| FR | 2 781 118 | 1/2001 |

OTHER PUBLICATIONS

German Search Report dated Mar. 6, 2006.
European Search Report dated Jun. 21, 2006.

* cited by examiner

*Primary Examiner*—Árpád Fábián Kovács

(57) ABSTRACT

A front harvesting attachment for a self-propelled harvesting machine having a central part pivotally mounted onto an intake channel of the harvesting machine, side parts that are moveable relative to the central part between an operating position, wherein the side parts are positioned on either side of the central part, and a raised transport position. Adjusting devices move the side parts between the operation and raised transport positions. Immobilizing devices selectively prevent movement of the front harvesting attachment relative to the intake channel during transport of the harvesting attachment. The immobilizing devices are coupled to the adjusting devices such that the immobilizing devices are actuated, thereby preventing movement of the front harvesting attachment relative to the intake channel, when the adjusting devices have moved the side parts to the raised transport position.

5 Claims, 3 Drawing Sheets

FRONT HARVESTING ATTACHMENT

FIELD OF THE INVENTION

The invention concerns a front harvesting attachment for a self-propelled harvesting machine with a center and side parts that are pivotally mounted to an intake channel of a harvesting machine.

BACKGROUND OF THE INVENTION

Prior agricultural mowing machines include a vehicle with several mowing units arranged to the side of the vehicle and alongside each other. The vehicle includes a carrier extending transverse to the direction of operation onto which a first mowing unit is fastened. A second, outer mowing unit is pivotally fastened to the carrier. The mowing units can be brought into a non-operating position, wherein the carrier is pivoted upward by a hydraulic cylinder, about an axis aligned with the direction of operation relative to the harvesting machine. This movement carries the first mowing unit, while simultaneously, the second mowing unit is pivoted inward, by a second hydraulic cylinder, about an axis extending in the direction of operation. During the mowing operation, the mowing units can pivot so as to oscillate freely about the aforementioned axes. During non-moving transport, the mowing units are immobilized by the hydraulic cylinders.

Also known is a self-propelled harvesting machine having a front harvesting attachment that is suspended so as to pivot on a sloped conveyor. In order to avoid undesirable movements of the front harvesting attachment about the axis of oscillation during transport, a hydraulic cylinder is provided and positioned to draw the front harvesting attachment against a stop. Here a separate hydraulic cylinder is provided to immobilize the front harvesting attachment, resulting in a relatively high cost.

Front harvesting attachments are also known, whereby they are attached so as to oscillate or pivot relative to a harvesting machine and must be manually connected with the intake channel of the harvesting machine for transportation on public roads, wherein locking elements or the like are attached. In this instance, the operator must exit the cab of the harvesting machine and descend in order to engage the locking assembly. There is also the danger that the attachment will inadvertently not be locked before operation on public roads.

Therefore, there is a need for an effective, reliable, less complicated, and convenient front harvesting attachment that can be secured against pivotal or oscillating movement, relative to the harvesting machine, during transportation on public roads.

SUMMARY

The invention concerns a front harvesting attachment with a center part that is attached so as to oscillate relative to an intake channel of a self-propelled harvesting machine. The center part can pivot about an axis extending at least approximately in the horizontal direction and in the forward operating direction. The axis of oscillation may be an actual axis about which the front harvesting attachment oscillates or an imaginary axis, about which the front harvesting attachment can perform rotary movement.

The front harvesting attachment includes the center part, removably attached to the intake channel, and two side parts. Each of the side parts is attached to one side of the center part in an operating position. The side parts can be brought into a raised transport position by adjusting devices, wherein the side parts are raised upward relative to the operating position. The side parts may be pivoted approximately ninety degrees into a vertical position, or further to one-hundred and eighty degrees, to a horizontal position lying flat on the center part.

Immobilizing devices prevent oscillating movement of the front harvesting attachment relative to the intake channel during transportation. Adjusting devices pivot the side parts between the operating position and the transport position, and simultaneously, activate the immobilizing devices.

In this way the front harvesting attachment is held stationary relative to the intake channel when the side parts are located in the transport position. In addition the immobilizing devices are released automatically when the side parts are moved to the operating position. It is not possible to move the side parts to the transport position without activating the immobilizing devices, therefore, locking the front harvesting attachment in position cannot be forgotten or overlooked.

A drive connection can be established in any known way, such as, by example, connection of the adjusting devices to a locking bar by linkages, levers, rope pulls or the like. Another possibility is the use of a flexible tensioning device, such as for example a rope or a chain, that is positioned between and interconnects a side part with an element connected to the intake channel. If required, the adjusting devices can pivot the front harvesting attachment automatically into a center position about the axis of oscillation.

The present invention can be applied to any desired type of front harvesting attachments, such as corn heads with mowing and intake assemblies, multi-component pick-ups for application to self-propelled forage harvesters, corn pickers with plucking assemblies for use on self-propelled combines or forage harvesters, cutter assemblies for the harvest of cereal crops and sunflower cutting assemblies for application to self-propelled combines, or for the generation of total-plant silage on forage harvesters.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE EMBODIMENTS

Figure 1:
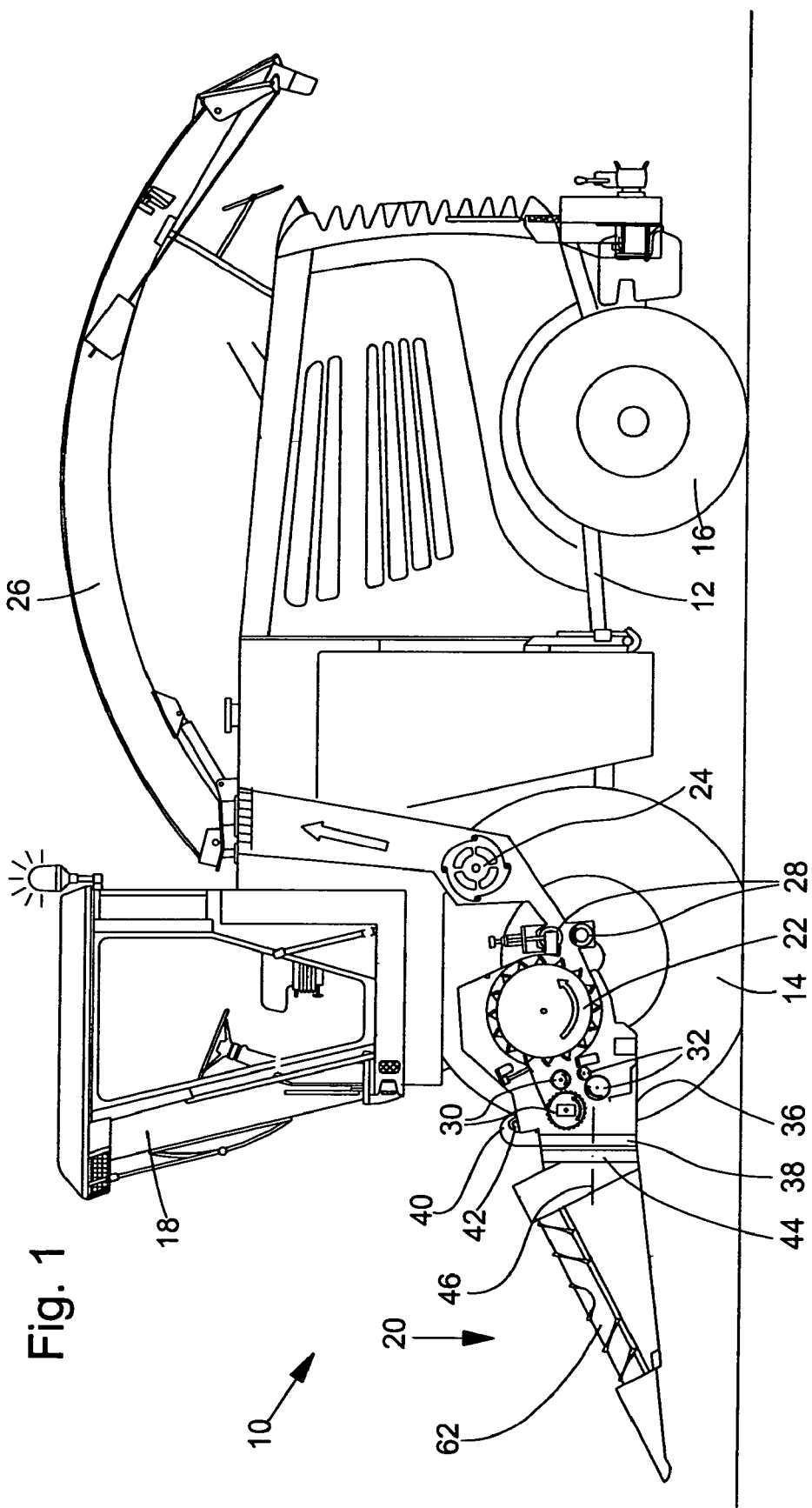
FIG. 1 is a side view of a forage harvester with a front harvesting attachment embodying the principles of the present invention.

Referring to FIG. 1, a harvesting machine having a front attachment and embodying the principles of the present invention is generally shown and designated at 10. The self-propelled forage harvester 10 is supported on a frame 12 that is carried by driven front wheels 14 and steerable rear wheels 16. The operation of the harvesting machine 10 is controlled from an operator's cab 18 from which a front harvesting attachment 20, appropriate for the harvest of stalk like plants, can be controlled visually. Crop taken up from the ground by means of the front harvesting attachment 20, for example corn, cereal crop or the like, is conducted to a chopper drum 22 by means of upper rough pressing rolls 30 and lower rough pressing rolls 32. The chopper drum 22 chops the crop into small pieces and delivers it to a conveyor assembly 24. As shown, the front harvesting attachment 20 is a corn head that operates independently of rows. The crop leaves the harvesting machine 10 to an accompanying trailer (not shown) through a discharge assembly 26 that can be adjusted in its position. A post-chopper reduction assembly 28 extends between the chopper drum 22 and the conveyor assembly 24, through which the crop to be conveyed is conducted tangentially to the conveyor assembly 24.

Figure 3:
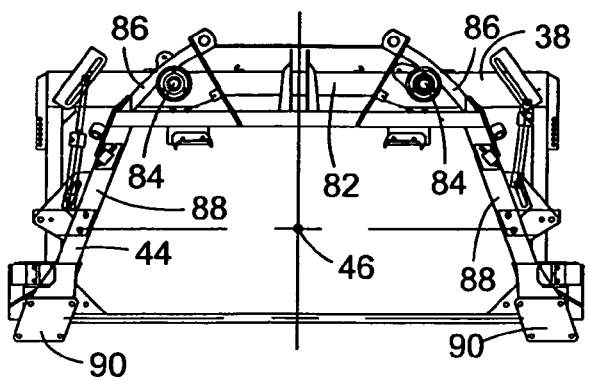
FIG. 3 is a front view of a mounting frame and a support frame of the front harvesting attachment.

The front harvesting attachment 20 is removably mounted to an intake channel 36 of the harvesting machine 10. The intake channel 36 contains the upper rough pressing rolls 30 and the lower rough pressing rolls 32. A mounting frame 38 includes prongs 40 that extend over upper retention elements 42 at the upper side of the forward end of the intake channel 36. In addition, the mounting frame 38 may also be locked or connected to the underside of the intake channel 36. A support frame 44, supports the front harvesting attachment 20 and is mounted to the mounting frame 38 for oscillating or pivoting relative to the mounting frame 38, and, in this way is mounted onto the intake channel 36 for oscillating or pivoting relative to the intake channel 36, about a virtual axis 46, extending approximately in the forward operating direction of the harvesting machine. The mounting frame 38 permits the front harvesting attachment 20 to pivot about the axis 46 during the harvesting operation. The front harvesting attachment 20 is supported on the ground by skids (not shown). The configuration of the mounting frame 38 is illustrated in FIG. 3 and is described in detail below.

Figure 2:
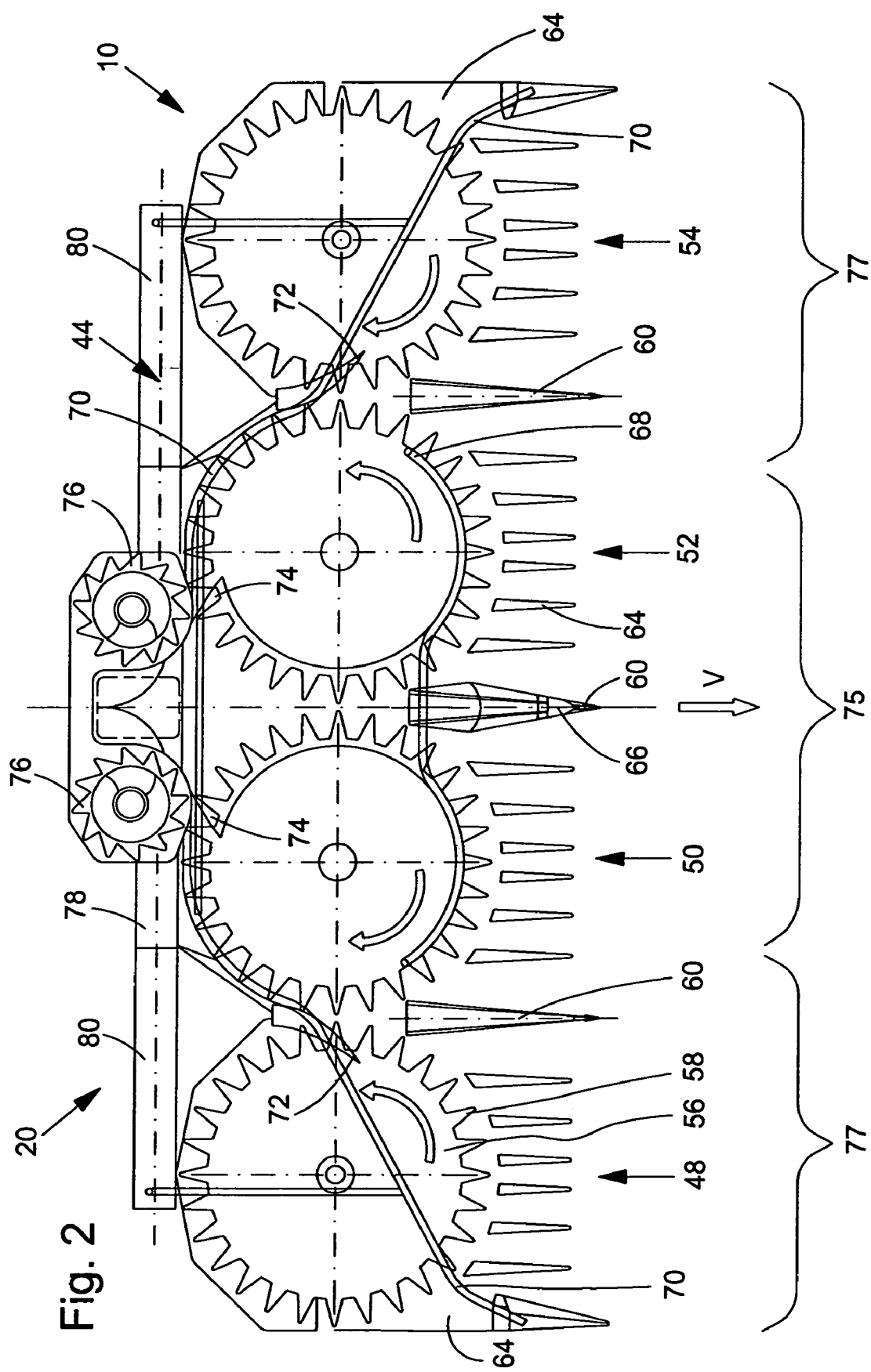
FIG. 2 is a top view of the front harvesting attachment.

As generally shown in FIG. 2, four mowing and intake assemblies 48, 50, 52, 54 are fastened to the support frame 44 of the front harvesting attachment 20. Each of the mowing and intake assemblies 48, 50, 52, 54 is composed of a lower cutter disk that can be brought into rotation and, arranged coaxially thereabove, are conveyor disks 56 that can also be rotated. The cutter disks are equipped with sharp teeth to separate the plant stalks from the stumps remaining in the ground. The stalks are accommodated in recesses 58 in the conveyor disks 56 and are transported to the harvesting machine 10 as described below.

Stalk dividers 60 are located between each of the mowing and intake assemblies 48, 50, 52, 54 to deflect the plants to the side and to bring the plants into the intake region of the mowing and intake assemblies 48, 50, 52, 54 if required. Driven stalk lifting screw conveyors 62 are located at both outer sides of the machine 10. Smaller stalk dividers 64 are arranged at the front sides of the mowing and intake assemblies 48, 50, 52, 54. A rough pressing bow 68 is located at the front side of the inner mowing and intake assemblies 50, 52 adjacent to the longitudinal center plane 66, its purpose is to press the plants forward so that they can be taken up by the mowing and intake assemblies 50, 52. Similarly, rough pressing bows 70 are also located above the outer mowing and intake assemblies 48, 54 and behind the central mowing and intake assemblies 50, 52. The operating width of each of the mowing and intake assemblies 48, 50, 52, 54 corresponds to two rows of plants, or approximately 1.5 meters. Therefore, the front harvesting attachment 20 can simultaneously harvest eight rows of corn.

During the mowing operation, the mowing and intake assemblies 48, 50, 52, 54 rotate as indicated in FIG. 2. Hence the inner mowing and intake assemblies 50, 52 adjacent to the longitudinal center plane 66 initially convey the plants to the outside and to the rear, while the outer mowing and intake assemblies 48, 54 rotate in a direction opposite to that of the adjacent mowing and intake assemblies 50, 52. As can be seen in FIG. 2, the outer mowing and intake assemblies 48, 54 transfer their share of the crop approximately in the center between the axes of rotation of the mowing and intake assemblies 48, 50 or 52, 54 to the inner mowing and intake assemblies 50, 52, for this purpose clean-up devices 72 are provided. On the rear side of the inner mowing and intake assemblies 50, 52 the harvested crop is lifted out of the recesses 58 by further clean-up devices 74 and delivered to slope conveyor drums 76 that rotate about axes inclined slightly to the front and that overcome the difference in height between the floor of the front harvesting attachment 20 and the following rough pressing rolls 30, 32 of the intake channel 36 of the harvesting machine 10.

The support frame 44 includes a central section 78, extending horizontally and transverse to the forward operating direction, that is supported on the mounting frame 38 and in the operating position, as shown in FIG. 2. Additionally, an outer section 80 extends parallel to the central section 78, from the sides of the central section 78. The central section 78 carries the slope conveyor drums 7 and the central mowing and intake assemblies 50, 52 and forms a central part 75 of the front harvesting attachment 20. Each of the outer sections 80 of the support frame 44 carries one of the outer mowing and intake assemblies 48, 54 and forms a side part 77 of the front harvesting attachment 20. As opposed to the central section 78, the outer sections 80 can be pivoted upward into a transport position about axes extending horizontally and in the forward operating direction. In this position they extend approximately vertically upward.

FIG. 3 illustrates a front view of the mounting frame 38 and part of the support frame 44 attached thereto. The mounting frame 38 includes the carrier 82 extending horizontally at the upper side of the intake channel 36, transverse to the forward operating direction. The rear side of the carrier 82 is in contact with the front side of the intake channel 36. The carrier 82 retains two rolls 84 that can rotate about their axes extending in the forward operating direction. Bent rods 86 or tubes lie upon the rolls 84. The rods 86 are connected with struts 88 extending at an angle downward and outward. At their lower ends, the struts 88 are connected to flanges 90, which, in turn, are fastened to the central section 78 of the support frame 44. Further rolls could also be fastened to the underside of the mounting frame 38, these rolls can be fastened to elements of the support frame 44 and support it in the upward direction. As described herein, the support frame 44 is able to rotate or oscillate freely about the virtual axis 46.

Figure 4:
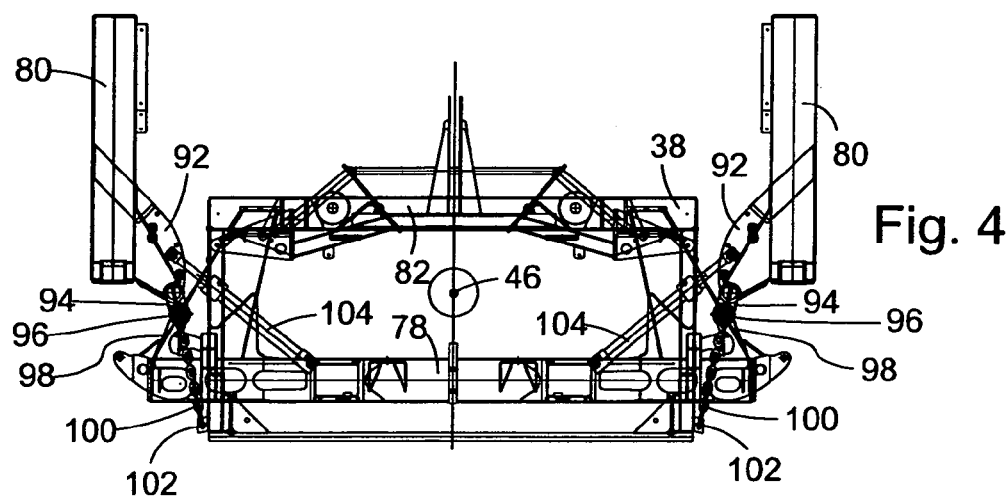
FIG. 4 is a front view of the support frame of the front harvesting attachment in the transport position.

Referring to FIG. 4, the complete support frame 44 and the mounting frame 38 are shown. Retainers 92 are also fastened to each of the outer sections 80 of the support frame 44 and extend inward and upward in the direction toward the longitudinal center plane 66. Bearing legs 94 are fastened rigidly to the retainers 92. The bearing legs 94 can be pivoted about axes 96 extending horizontally and in the forward operating direction relative to the retainers 98, which are connected to the central section 78 of the support frame 44. Hydraulic cylinders 104 are used as adjusting devices and extend between the retainers 92 and the central section 78 and make it possible to pivot the outer sections 80 between the operating position shown in FIGS. 2 and 5 and the transport position shown in FIG. 4. On the basis of the reduced width of the front harvesting attachment 20 in the latter position, operation on public roads without any problems is possible with the front harvesting attachment 20 remaining on the front side of the harvesting machine 10.

In order to prevent an oscillating movement of the front harvesting attachment 20 about the axis 46 during transport, a connection is provided in each case between the outer sections 80 and the mounting frame 38 in the transport position. This connection is provided by a chain or other means 100 that is fastened at its first end at the attaching point of the bearing legs 94 on the retainers 92 to one of the outer sections 80. Each of the second ends of the chains 100 are fastened to a connecting point 102 on the lower corner of the rectangular mounting frame 38.

Accordingly, the chains 100 are connected rigidly to the intake channel 36 over the mounting frame 38. The attaching points of the bearing legs 94 to the retainers 92, to which, in addition, the chains 100 are also fastened, are further removed from the attachment points 100 of the chains 100 in the transport position (see FIG. 4) than in the operating position (see FIG. 5). The length of the each of the chains 100 is dimensioned in such a way that they are taut in the transport position and accordingly attain a connection between the mounting frame 38 and the outer sections 80. The hydraulic cylinders 104, used to pivot the outer sections 80 relative to the central section 78 about the axes 96, rigidly retain the outer sections 80 relative to the central section 78. Therefore, a continuous connection is established, if necessary, during upward pivotal movement of the outer sections 80 by means of successive stretching of the chains 100, of the sections that are oscillating downward about the axes 46. Therefore, the central section 78 becomes directed parallel to the underside and the upper side of the intake channel 36, and secures and immobilizes the entire front harvesting attachment 20 against any oscillating movement about the axis 46.

Figure 5:
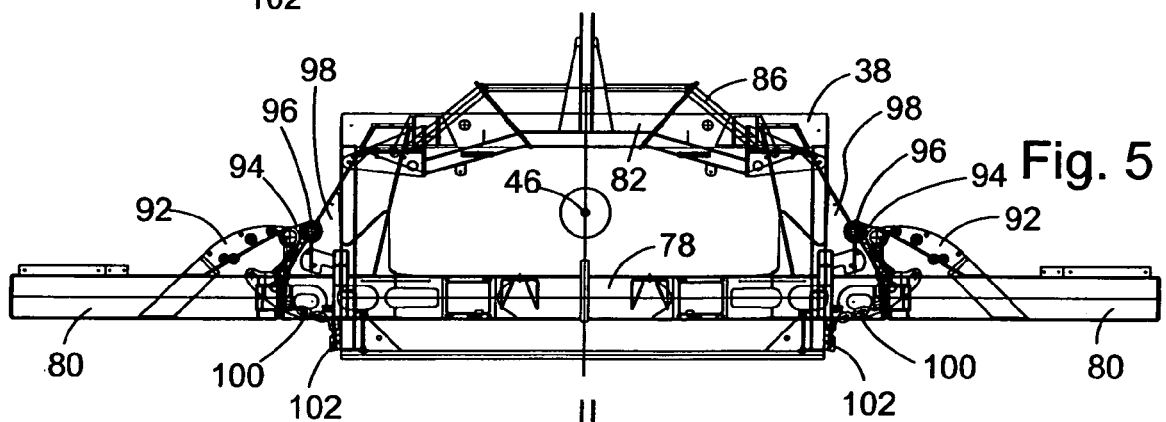
FIG. 5 is a front view of the support frame of the front harvesting attachment in the operating position.
Figure 6:
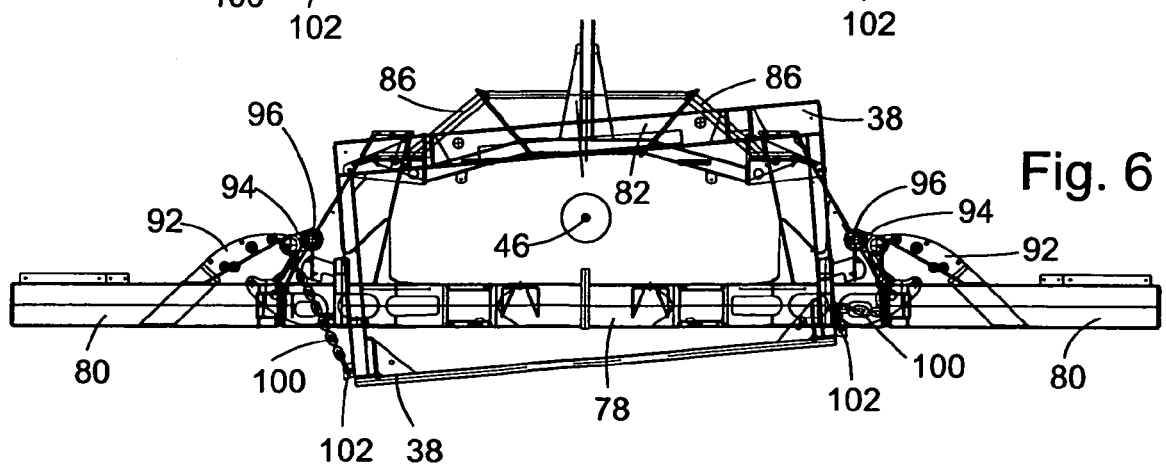
FIG. 6 is a front view of the support frame of the front harvesting attachment in a position oscillated away from horizontal.

If the side sections 80 are pivoted downward from the transport position shown in FIG. 4 to their operating position shown in FIG. 5, the tension on the chains 100 is released and the immobilization of the front harvesting attachment 20 is released automatically. The lengths of the chains 100 are dimensioned such that, when the outer sections 80 are in the operating position, the support frame 44 can perform an oscillating movement about the axis 46, limited by the lengths of the chains 100, with the right hand chain 100 limiting clockwise movement of the support frame 44 about the axis 46 relative to the mounting frame 38. as shown in FIG. 6. and with the right hand chain 100 similarly limiting counter clockwise rotation of the support frame 44 about the axis 46 relative to the mounting frame.

In accordance with the provisions of the patent statutes, the present invention has been described in what is considered to represent its preferred embodiment. However, it should be noted that the invention can be practiced otherwise than as specifically illustrated and described.

The invention claimed is:

1. A front harvesting attachment for a self-propelled harvesting machine comprising:
   a central part pivotally mounted onto a mounting frame adapted for being mounted onto an intake channel of the harvesting machine for oscillating about a generally horizontal axis extending in a forward direction of travel;
   side parts mounted one to each of opposite sides of said central part that are moveable relative to the central part between an operation position, wherein the side parts extend generally horizontally on either side of the central part, and a raised transport position, wherein the side parts extend upright on either side of the central part;
   adjusting devices coupled between said central part and each of said side parts that are adapted to move the side parts between the operation position and the raised transport position; and
   immobilizing devices adapted to selectively prevent movement of the front harvesting attachment relative to the intake channel during transport of the harvesting attachment, the immobilizing devices being coupled between said mounting frame and each of the side parts such that the immobilizing devices are actuated by operation of said adjusting devices so as to prevent movement of the front harvesting attachment relative to the mounting frame, when the adjusting devices have moved the side parts to the raised transport position.

2. The front harvesting attachment according to claim 1, wherein the immobilizing devices include a flexible tensioning device positioned between and interconnecting each one of the side parts and the mounting frame.

3. The front harvesting attachment according to claim 2, wherein the flexible tensioning device is one of a rope and a chain.

4. The front harvesting attachment according to claim 1, wherein the central part and the side parts each include assemblies adapted for harvesting plants with stalks.

5. The front harvesting attachment of claim 4, wherein the assemblies adapted for harvesting plants with stalks each include one of a mowing and intake assembly and a plucking assembly.

* * * * *